W. R. FEE.

Machines for Hulling Cotton-Seed.

No. 5,550. Reissued August 26, 1873.

Attest.

Inventor.

Wm. R. Fee

UNITED STATES PATENT OFFICE.

WILLIAM R. FEE, OF CINCINNATI, OHIO.

IMPROVEMENT IN MACHINES FOR HULLING COTTON-SEED.

Specification forming part of Letters Patent No. 17,961, dated August 11, 1857; extended seven years; reissue No. 5,550, dated August 26, 1873; application filed August 2, 1872.

*To all whom it may concern:*

Be it known that I, WILLIAM R. FEE, of the city of Cincinnati, in the county of Hamilton and State of Ohio, have invented a certain new and useful Improvement in Hulling Cotton-Seed, of which the following is a specification:

All cotton-seed hullers hitherto employed subject the seed to a grinding action, which so packs the hulls, fibers, and kernels together that it is impossible to separate them in the process of screening. The grinding action sometimes forms rolls, which are held together by the cotton fibers. When grooved cylinders are employed, the grooves usually fill as they pass under the opposing concave, and remain full until they again emerge from the concave, when the crushed seed falls in lumps. It not unfrequently happens that hulling-mills choke up so as to require separation of the parts for cleaning, and it is found to be utterly impossible to hull damp seed. This very defective mode of hulling renders the subsequent screening imperfect, and occasions a ruinous loss of oil. Some of the oil, being expressed by the grinding action, is absorbed by the porous hulls and the fibers of cotton, and lost in the screening. Another portion is wasted in the fragments of kernels which are screened out with the hulls.

The object of my invention is to overcome the above-mentioned difficulties by cutting the seeds open in such a manner that the divided kernels fall clean from the hull, having cut surfaces, to which neither the cotton fibers, nor the hulls will adhere; consequently the screening process can be perfect. My invention consists of cutting-edges with intervening furrows for hulling cotton-seed by a clear cut instead of a grinding or crushing action.

In accompanying drawings, Figure I is a vertical transverse section of a machine constructed after my invention. Fig. II is a side elevation of the same. Fig. III is a plan of the cutting and feeding cylinder.

Similar letters of reference in each of the several figures indicate corresponding parts.

Figure 1:
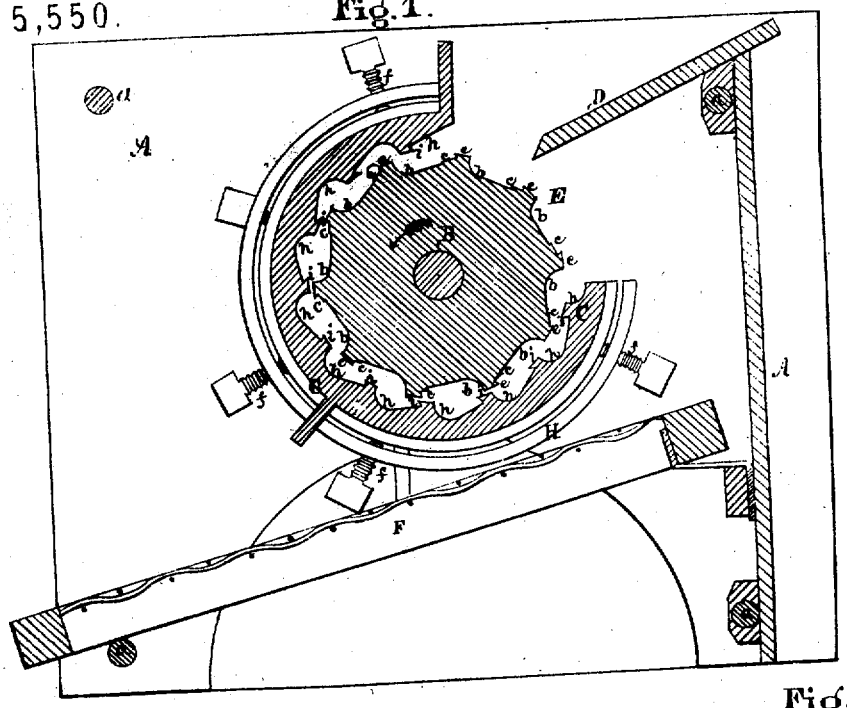
Figure 2:
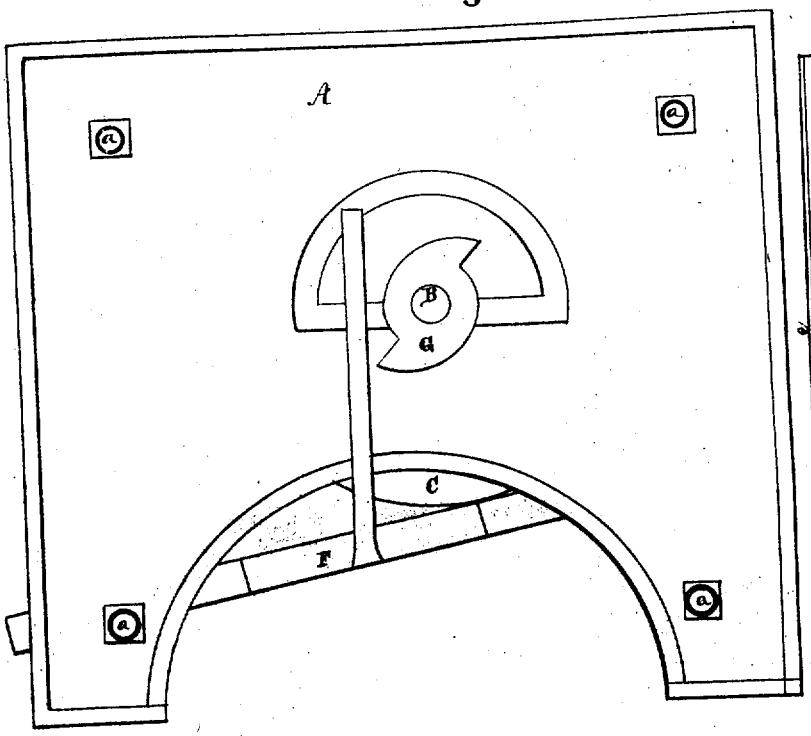
Figure 3:
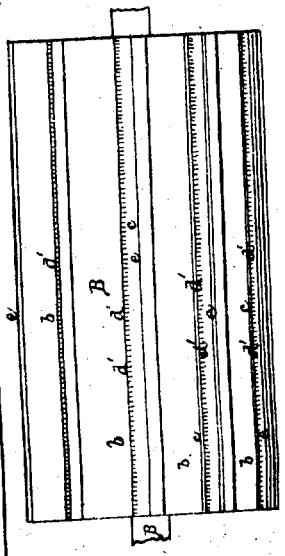

In accompanying drawings, A, Figs. 1 and 2, represents any suitable frame for supporting the cylinder B and concave C of my huller. The cylinder B, Fig. 1, is armed with a series of cutting-edges, *e e*, between each two of which is a furrow, *b*, of proper depth to cut the seed instead of grinding it. The concave C is in like manner armed with a series of cutters, *i*, and intervening furrows *h*, which latter form with the furrows *b* spaces of sufficient dimensions to afford the seed opportunity to turn over in passing from one cutting-edge to the next adjacent cutting-edge. The cutting-edges *e* upon the cylinder B are set in the opposite direction to the cutting-edges *i* upon the concave C, as seen in Fig. 1. The furrows *b* and *h* are very steep on one side, while the other is a gradually inclined plane, in order that the seeds may ride up to the cutting-edges. In the furrows upon the cylinder B there is a small ridge or rib, *c*, with a file-edge, *d'*, Fig. 3, which catches the fibers on the cotton-seed and carries the seed into the huller just in the position to receive the stroke of the first cutting-edge upon the concave. Another effect of the file-edged rib is to prevent the seed from bridging as it is fed into the huller from the feed-board D. The cylinder B revolves in the direction indicated by the arrow, seen in Fig. 1. As the cutting-edges upon the cylinder pass those upon the concave, the cotton-seeds are cut completely open, one part of each seed being carried forward by the cutting-edges of the cylinder, and the other part being knocked backward by the cutting-edges of the concave. When the seeds are thus cut open, the force of the blow, and the consequent recoil of the hull by its own elasticity, throws most of the kernels from the hull. The stroke of the huller also drives the broken seed violently against the sides of the deep furrows, so as to complete the operation of knocking all the kernels from the hulls. That portion of seed which passes the first stroke of the concave uncut has a tendency to ride up the inclined planes of the furrows until the seeds are caught by the succeeding edges. This tendency of the seeds to the cutting-edges is produced in part by the reversed position of the two sets of inclined planes, and in part by gravitation of the seeds, but chiefly by the action of the air, to which a whirling and sucking action is given by the motion of the cylinder. In working the huller the high speed of the cylinder drives the seed through the huller with an accelerated motion, so that choking of the huller is impossible. In constructing my huller the cylinder B is cast hollow, with walls about one and a half inch in thickness. The cylinder may be three feet in length by fourteen inches in diameter. The ends of the cylinder may consist of radial arms. These arms, the furrows *b*, and the cutting-edges *c* are cast with the cylinder. A wrought-iron axle, two inches in diameter, is inserted through the center of the cylinder, when the radial arms meet. Afterward the edges of the cylinder are turned off until they are all equidistant from the center of motion, and then they are planed smooth to form the cutting-edges. The furrows may be about five-eighths of an inch deep, or more or less, as is found desirable, and the distance from one cutting-edge to another about one and one-half inch, leaving one-fourth of an inch nearly flat surface next the cutting-edge, or more or less, as found desirable. The file-edged rib requires dressing into form. The concave C is cast in one or more parts, and the cutting-edges and furrows dressed up in a manner similar to those of the cylinder, except the file-edged rib, which is omitted in the concave. The concave is supported by curved flanges, seen at H, Fig. 1. These flanges are cast with the end plates of the frame A. In Fig. 1, *f* are set-screws for regulating the distance between the concave and the cylinder. The end plates of the frame may be cast from the same pattern, and are connected by transverse bars or bolts *a*, Fig. 2. In the drawings is seen a vibrating screen, F, moved by a cam, G, Fig. 2; but in practice I prefer using a rotating screen.

A single huller is capable of hulling three tons of cotton-seed per hour, which is twenty-four times the amount hulled by any machine per hour previous to the invention of my huller. Moreover, by this mode of cutting instead of crushing or grinding, thirty per cent. more oil is made from a given quantity of seed. My invention has been tested with cotton-seed drenched with water, and the hulling was still complete, which is impossible with any other known huller.

I do not claim the device shown in the mill of I. Walker, patented in 1855, or any other form of mill-dress heretofore known.

Having thus fully described my invention, what I claim, and desire to secure by Letters Patent, is—

1. A series of cutting-edges with intervening furrows, for the purpose of hulling cotton-seed by a cutting action, which renders both the screening process and the expression of the oil easy and complete, as set forth.

2. The employment, in a cotton-seed huller, of a series of cutting-edges to hull cotton-seed, such cutting-edges being separated by intervening spaces of sufficient dimension to afford the seed opportunity to turn over in passing from one cutting-edge to the next adjacent cutting-edge, substantially as set forth.

3. The employment of a series of cutting-edges to hull cotton-seed, such cutting-edges being placed at a sufficient distance apart to permit the seed to turn over in passing from one cutting-edge to the next adjacent cutting-edge, when such cutting-edges have a shearing action, substantially as specified.

WM. R. FEE.

Witnesses:
WM. G. HOSEA,
B. STORER, Jr.